(12) United States Patent
Fujiwara

(10) Patent No.: US 10,688,762 B2
(45) Date of Patent: Jun. 23, 2020

(54) LAMINATE FOR AUTOMOTIVE INTERIOR MATERIAL

(71) Applicant: ZEON CORPORATION, Chiyoda-ku, Tokyo (JP)

(72) Inventor: Takanori Fujiwara, Tokyo (JP)

(73) Assignee: ZEON CORPORATION, Chiyoda-ku, Tokyo (JP)

( * ) Notice: Subject to any disclaimer, the term of this patent is extended or adjusted under 35 U.S.C. 154(b) by 0 days.

(21) Appl. No.: 15/556,814

(22) PCT Filed: Mar. 11, 2016

(86) PCT No.: PCT/JP2016/001400
§ 371 (c)(1),
(2) Date: Sep. 8, 2017

(87) PCT Pub. No.: WO2016/147637
PCT Pub. Date: Sep. 22, 2016

(65) Prior Publication Data
US 2018/0043668 A1    Feb. 15, 2018

(30) Foreign Application Priority Data

Mar. 19, 2015  (JP) ................................ 2015-055507

(51) Int. Cl.
*B32B 27/30* (2006.01)
*B60K 37/00* (2006.01)
(Continued)

(52) U.S. Cl.
CPC .............. *B32B 27/30* (2013.01); *B32B 3/02* (2013.01); *B32B 5/022* (2013.01); *B32B 5/16* (2013.01);
(Continued)

(58) Field of Classification Search
CPC .......... B32B 7/12; B32B 27/304; B32B 5/22; B32B 5/022; B60R 13/0256
See application file for complete search history.

(56) References Cited

U.S. PATENT DOCUMENTS 4,675,356 A  6/1987 Miyata
7,851,039 B2  12/2010 Boinais et al.
(Continued)

FOREIGN PATENT DOCUMENTS

CN  102131637 A  7/2011
CN  103930505 A  7/2014
(Continued)

OTHER PUBLICATIONS

Jun. 7, 2016, International Search Report issued in the International Patent Application No. PCT/JP2016/001400.
(Continued)

*Primary Examiner* — Hai Vo
(74) *Attorney, Agent, or Firm* — Kenja IP Law PC

(57) ABSTRACT

Disclosed is a laminate for automotive interior material which includes a vinyl chloride resin layer and a tape, where no mark appears at a portion where the tape is laminated even when the laminate is lined with a foamed polyurethane layer and heated. The disclosed laminate for automotive interior material includes a vinyl chloride resin layer and a tape disposed on one side in a thickness direction of the vinyl chloride resin layer, wherein the tape includes a substrate having a porous structure and an adhesive layer, and wherein the adhesive layer is positioned closer to the vinyl chloride resin layer than the substrate.

7 Claims, 1 Drawing Sheet

(51) Int. Cl.
  *B32B 27/12*    (2006.01)
  *B32B 5/16*     (2006.01)
  *B32B 3/02*     (2006.01)
  *B32B 5/24*     (2006.01)
  *B32B 5/30*     (2006.01)
  *B32B 5/22*     (2006.01)
  *B32B 5/02*     (2006.01)
  *B32B 5/18*     (2006.01)
  *B32B 7/12*     (2006.01)
  *B60R 13/02*    (2006.01)

(52) U.S. Cl.
  CPC ............ *B32B 5/18* (2013.01); *B32B 5/22* (2013.01); *B32B 5/245* (2013.01); *B32B 5/30* (2013.01); *B32B 7/12* (2013.01); *B32B 27/12* (2013.01); *B32B 27/304* (2013.01); *B60K 37/00* (2013.01); *B60R 13/0256* (2013.01); *B32B 2264/0242* (2013.01); *B32B 2605/003* (2013.01)

(56) References Cited

U.S. PATENT DOCUMENTS

| | | | | |
|---|---|---|---|---|
| 2004/0033362 | A1* | 2/2004 | Mino | C08J 9/32 428/411.1 |
| 2004/0094856 | A1* | 5/2004 | Delcros | B29C 44/1257 264/46.5 |
| 2006/0062993 | A1* | 3/2006 | Ogata | B32B 5/18 428/319.3 |
| 2006/0286343 | A1* | 12/2006 | Curro | A61F 13/00 428/131 |
| 2010/0068425 | A1 | 3/2010 | Boinais et al. | |
| 2014/0212676 | A1 | 7/2014 | Tetsui et al. | |
| 2014/0308482 | A1* | 10/2014 | Masunari | C09J 7/21 428/160 |

FOREIGN PATENT DOCUMENTS

| | | |
|---|---|---|
| JP | S61174270 A | 8/1986 |
| JP | H04353559 A | 12/1992 |
| JP | 2012086661 A | 5/2012 |
| JP | 2014172217 A | 9/2014 |
| WO | 2011086813 A1 | 7/2011 |
| WO | 2013027489 A1 | 2/2013 |

OTHER PUBLICATIONS

The Kinki Chemical Society, "Polyvinyl Chloride" edited by the Division of Polymer Sciences, published by Nikkan Kogyo Shimbun Ltd., 1988, Japan, pp. 75-104.

Sep. 27, 2018, the Extended European Search Report issued by the European Patent Office in the rresponding European Patent Application No. 16764468.1.

Sep. 19, 2017, International Preliminary Report on Patentability issued in the International Patent Application No. PCT/JP2016/001400.

* cited by examiner

LAMINATE FOR AUTOMOTIVE INTERIOR MATERIAL

TECHNICAL FIELD

The present disclosure relates to laminates for automotive interior material in which a vinyl chloride resin layer and a tape are laminated.

BACKGROUND

Automotive instrument panels have a structure in which a foamed polyurethane layer is provided between a skin made of vinyl chloride resin and a substrate. The vinyl chloride skin undergoes color changes with time and its heat aging resistance decreases. To solve this problem, laminates for automotive interior material that exhibit good heat aging resistance have been proposed in which (a) a vinyl chloride resin layer and (b) at least one layer selected from the group consisting of a polyester layer, a metal layer, a paper layer, a polyethylene layer, and a polypropylene layer are laminated (see, e.g., PTL 1).

CITATION LIST

Patent Literature

PTL 1: WO2011086813A

SUMMARY

Technical Problem

In automotive interior materials such as automotive instrument panels, as illustrated in FIG. 1, a skin 1 made of vinyl chloride resin may be garnished with threads 2 sewn into the skin 1. When the skin 1 has been subjected to such sewing, however, there is a concern that, when the skin 1 is lined with a foamed polyurethane layer, the raw material of the foamed polyurethane layer or other unwanted materials enters the skin 1 through holes of the sewn portion. To address such a problem of entry of unwanted materials, for example, as illustrated in FIG. 2, it is conceivable to laminate a tape 3 onto the sewn portion of the skin 1 to prevent entry of unwanted materials, such as the raw material of the foamed polyurethane layer, through holes of the sewn portion. In the meantime, when a skin 1 such as that illustrated in FIG. 3, which has a tape 3 laminated thereon and lined with a foamed polyurethane layer 4, is heated, the components of the skin 1 and foamed polyurethane layer 4 migrate between the skin 1 and foamed polyurethane layer 4 to cause color changes in the skin 1. These components, however, cannot easily pass through a portion where the tape 3 is laminated thus leaving a mark of the tape 3 when the skin 1 is seen from the opposite side to the foamed polyurethane layer 4 (i.e., seen in the direction of arrow in FIG. 3) and deteriorating the appearance of the skin 1.

Thus, recently, there has been a need to provide a laminate for automotive interior material which shows no mark of a tape laminated onto the sewn portion even when the vinyl chloride resin layer is subjected to sewing and lined with a foamed polyurethane layer. However, no such laminates for automotive interior material have yet been provided.

It would therefore be helpful to provide a laminate for automotive interior material which comprises a vinyl chloride resin layer and a tape, wherein no mark appears at a portion where the tape is laminated even when the laminate is lined with a foamed polyurethane layer and heated.

Solution to Problem

The inventor made extensive studies to solve the foregoing problem and established that when a tape formed of a specific substrate and of an adhesive layer is laminated onto a vinyl chloride resin layer, no mark appears at a portion where the tape is laminated even when the laminate is lined with a foamed polyurethane layer and heated. The present disclosure was completed based on this finding.

The present disclosure is directed to a laminate for automotive interior material, which comprises a vinyl chloride resin layer and a tape disposed on one side in a thickness direction of the vinyl chloride resin layer, wherein the tape comprises a substrate having a porous structure and an adhesive layer, and wherein the adhesive layer is positioned closer to the vinyl chloride resin layer than the substrate.

The vinyl chloride resin layer is preferably a vinyl chloride resin layer subjected to sewing.

The substrate is preferably made of non-woven fabric.

The adhesive layer preferably has a porous structure.

The laminate for automotive interior material is preferably a laminate for automotive instrument panel.

Advantageous Effect

In the disclosed laminate for automotive interior material, no mark appears at a portion where the tape is laminated even when the laminate is lined with a foamed polyurethane layer and heated.

Figure 1:
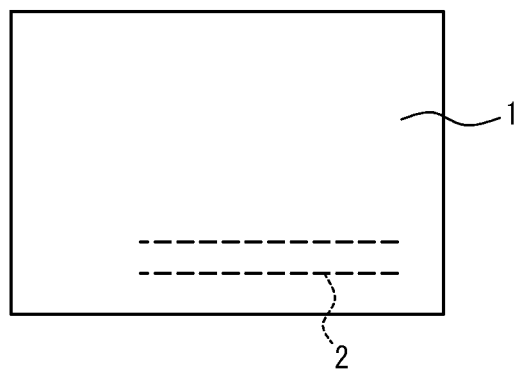
FIG. 1 illustrates an automotive instrument panel in which a skin made of vinyl chloride resin is subjected to sewing.
Figure 2:
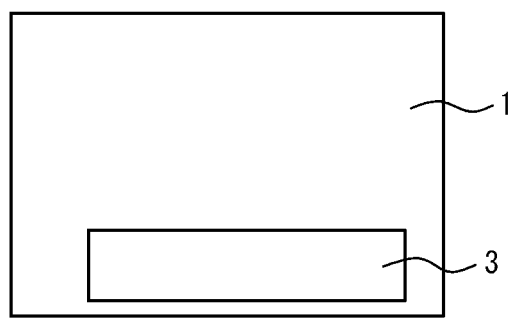
FIG. 2 illustrates a skin having a tape laminated onto a sewn portion.
Figure 3:
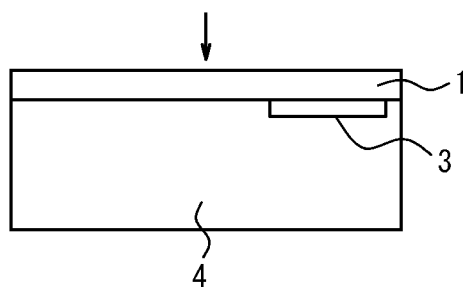
FIG. 3 is a cross-sectional view schematically illustrating a laminate for automotive instrument panel in which a skin and a tape are laminated, with the laminate lined with a foamed polyurethane layer.

DETAILED DESCRIPTION (Laminate for Automotive Interior Material)

The disclosed laminate for automotive interior material comprises a vinyl chloride resin layer and a tape disposed on one side in a thickness direction of the vinyl chloride resin layer. The laminate is then provided (lined) with a foamed layer such as a foamed polyurethane layer on a side where the tape is positioned (i.e., on one side in the thickness direction of the vinyl chloride resin layer) and is used for example to manufacture an automotive interior material such as an automotive instrument panel or door trim. That is, in an automotive interior material formed using the disclosed laminate for automotive interior material, generally, the vinyl chloride resin layer of the laminate constitutes a skin with the tape and foamed layer being positioned on the rear side of the skin formed of the vinyl chloride resin layer (i.e., on one side in the thickness direction of the vinyl chloride resin layer).

It should be noted the disclosed laminate for automotive interior material usually has a structure in which the tape is laminated on one side of the vinyl chloride resin layer, but may further comprise layer(s) other than the vinyl chloride resin layer and tape as long as the target effect is not greatly compromised. Specifically, without limitation, the disclosed laminate for automotive interior material may comprise, for example, layer(s) for increasing heat aging resistance, such as that disclosed in WO2011/086813, between the vinyl chloride resin layer and tape. Further, the disclosed laminate for automotive interior material may comprise a decorative layer for conferring design properties to an automotive interior material on the other side in the thickness direction of the vinyl chloride resin layer (i.e., on the side opposite to the tape).

<Vinyl Chloride Resin Layer>

The vinyl chloride resin layer is preferably formed by powder forming of a vinyl chloride resin composition for powder forming. The vinyl chloride resin composition contains vinyl chloride resin (a), and optionally further contains an additive such as a plasticizer.

[Vinyl Chloride Resin]

The vinyl chloride resin (a) of the vinyl chloride resin composition for powder forming can contain vinyl chloride resin particles (a1), and optionally further can contain vinyl chloride resin fine particles (a2). Vinyl chloride resins which may constitute the vinyl chloride resin particles (a1) and vinyl chloride resin fine particles (a2) include homopolymers of vinyl chloride, as well as copolymers containing preferably 50% by mass or more, more preferably 70% by mass or more, of a vinyl chloride unit. Examples of comonomers of vinyl chloride copolymers include olefins such as ethylene and propylene; halogenated olefins such as allyl chloride, vinylidene chloride, vinyl fluoride, and trifluorochloroethylene; carboxylic acid vinyl esters such as vinyl acetate and vinyl propionate; vinyl ethers such as isobutyl vinyl ether and cetyl vinyl ether; allyl ethers such as allyl 3-chloro-2-oxypropyl ether and allyl glycidyl ether; unsaturated carboxylic acids such as acrylic acid, maleic acid, itaconic acid, 2-hydroxyethyl acrylate, methyl methacrylate, monomethyl maleate, diethyl maleate, and maleic anhydride, esters thereof or acid anhydrides thereof; unsaturated nitriles such as acrylonitrile and methacrylonitrile; acrylamides such as acrylamide, N-methylol acrylamide, acrylamido-2-methylpropanesulfonic acid, and (meth)acrylamidopropyltrimethylammonium chloride; and allyl amines such as allyl amine benzoate and diallyl dimethyl ammonium chloride, and derivatives thereof. The above-exemplified monomers are only a part of monomers (comonomers) copolymerizable with vinyl chloride, and examples of usable comonomers include various monomers exemplified in "Polyvinyl Chloride" edited by the Division of Polymer Sciences, The Kinki Chemical Society, Japan, published by Nikkan Kogyo Shimbun Ltd., 1988, pp. 75-104. One or more of these monomers may be used. Examples of vinyl chloride resins that may constitute the vinyl chloride resin particles (a1) and vinyl chloride resin fine particles (a2) also include resins formed by graft polymerization of such resins as ethylene-vinyl acetate copolymers, ethylene-methyl methacrylate copolymers, ethylene-ethyl acrylate copolymers and chlorinated polyethylenes with either (1) vinyl chloride or (2) vinyl chloride and the comonomers mentioned above.

As used herein, "(meth)acryl" means acryl and/or methacryl. "Resin particles" refer to particles having a particle diameter of 30 μm or more, and "resin fine particles" refer to particles having a particle diameter of less than 30 μm.

The vinyl chloride resins may be produced by any of the production methods known in the art, e.g., suspension polymerization, emulsion polymerization, solution polymerization, or bulk polymerization.

In the vinyl chloride resin composition for powder forming, the vinyl chloride resin particles (a1) function as a matrix resin, and the vinyl chloride resin fine particles (a2) function as a dusting agent (powder flow improver) to be described later. The vinyl chloride resin particles (a1) are preferably produced by suspension polymerization. The vinyl chloride resin fine particles (a2) are preferably produced by emulsion polymerization.

[[Vinyl Chloride Resin Particles (a1)]]

The vinyl chloride resin particles (a1) preferably have an average particle diameter of 50 μm or more, more preferably 100 μm or more, and preferably 500 μm or less, more preferably 250 μm or less, even more preferably 200 μm or less. When the average particle diameter of the vinyl chloride resin particles (a1) is within the above range, the powder flowability of the vinyl chloride resin composition for powder forming improves and also the smoothness of a vinyl chloride resin article (vinyl chloride resin layer) formed by powder forming of the vinyl chloride resin composition improves. As used herein, "average particle diameter" refers to a volume-average particle diameter measured by laser diffraction in compliance with JIS Z 8825.

The vinyl chloride resin constituting the vinyl chloride resin particles (a1) preferably has an average degree of polymerization of 800 to 5,000, more preferably 800 to 3,000, even more preferably 1,600 to 2,800. In the present disclosure, "average degree of polymerization" is measured in compliance with JIS K 6720-2.

[[Vinyl Chloride Resin Fine Particles (a2)]]

The preferred average particle diameter of the optional vinyl chloride resin fine particles (a2) is 0.1 μm to 10 μm. When the average particle size of the vinyl chloride resin fine particles (a2) is within the above range, the powder flowability of the vinyl chloride resin composition for powder forming improves.

The vinyl chloride resin constituting the vinyl chloride resin fine particles (a2) preferably has an average degree of polymerization of 500 or more, more preferably 600 or more, even more preferably 700 or more, and preferably 5,000 or less, more preferably 3,000 or less, even more preferably 2,500 or less.

The proportion of the vinyl chloride resin fine particles (a2) in 100% by mass of the vinyl chloride resin (a) is preferably 0% by mass to 30% by mass, more preferably 1% by mass to 30% by mass, even more preferably 5% by mass to 25% by mass, particularly preferably 8% by mass to 20% by mass. When the proportion of the vinyl chloride resin fine particles (a2) is within the above range, the vinyl chloride resin composition for powder forming exhibits good powder flowability.

[Additives]

The vinyl chloride resin composition for powder forming may contain various additives in addition to the above-mentioned vinyl chloride resin (a). Examples of additives include, but not specifically limited to, plasticizers, perchloric acid-treated hydrotalcite, zeolite, fatty acid metal salts, dusting agents other than the vinyl chloride resin fine particles (a2) (powder flow improvers; hereinafter sometimes referred to as "other dusting agents"), and other additives.

[[Plasticizer]]

The vinyl chloride resin composition for powder forming preferably contains a plasticizer. Specific examples of plasticizers include the following primary and secondary plasticizers.

Examples of so-called primary plasticizers include trimellitic acid esters such as tri-n-hexyl trimellitate, tri-n-heptyl trimellitate, tri-n-octyl trimellitate, tri-(2-ethylhexyl) trimellitate, tri-n-nonyl trimellitate, tri-n-decyl trimellitate, triisodecyl trimellitate, tri-n-undecyl trimellitate, tri-n-dodecyl trimellitate, tri-n-alkyl trimellitate (an ester having two or more alkyl groups with different numbers of carbon atoms in the molecule, with the proviso that the number of carbon atoms in the alkyl is 6 to 12), trialkyl trimellitate (an ester having two or more alkyl groups having different numbers of carbon atoms in the molecule, with the proviso that the number of carbon atoms in the alkyl is 8 to 10), and tri-n-alkyl trimellitate (an ester having two or more alkyl groups having different numbers of carbon atoms in the molecule, with the proviso that the number of carbon atoms in the alkyl is 8 to 10; pyromellitic acid esters such as tetra-n-hexyl pyromellitate, tetra-n-heptyl pyromellitate, tetra-n-octyl pyromellitate, tetra-(2-ethylhexyl) pyromellitate, tetra-n-nonyl pyromellitate, tetra-n-decyl pyromellitate, tetraisodecyl pyromellitate, tetra-n-undecyl pyromellitate, tetra-n-dodecyl pyromellitate, and tetra-n-alkyl pyromellitate (an ester having two or more alkyl groups having different numbers of carbon atoms in the molecule, with the proviso that the number of carbon atoms in the alkyl is 6 to 12); epoxidized vegetable oils such as epoxidized soybean oil and epoxidized linseed oil; phthalic acid derivatives such as dimethyl phthalate, diethyl phthalate, dibutyl phthalate, di-(2-ethylhexyl) phthalate, di-n-octyl phthalate, diisobutyl phthalate, diheptyl phthalate, diphenyl phthalate, diisodecyl phthalate, ditridecyl phthalate, diundecyl phthalate, dibenzyl phthalate, butyl benzyl phthalate, dinonyl phthalate, and dicyclohexyl phthalate; isophthalic acid derivatives such as dimethyl isophthalate, di-(2-ethylhexyl) isophthalate and diisooctyl isophthalate; tetrahydrophthalic acid derivatives such as di-(2-ethylhexyl) tetrahydrophthalate, di-n-octyl tetrahydrophthalate, and diisodecyl tetrahydrophthalate; adipic acid derivatives such as di-n-butyl adipate, di(2-ethylhexyl) adipate, diisodecyl adipate, and diisononyl adipate; azelaic acid derivatives such as di-(2-ethylhexyl) azelate, diisooctyl azelate, and di-n-hexyl azelate; sebacic acid derivatives such as di-n-butyl sebacate, di-(2-ethylhexyl) sebacate, diisodecyl sebacate, and di-(2-butyloctyl) sebacate; maleic acid derivatives such as di-n-butyl maleate, dimethyl maleate, diethyl maleate, and di-(2-ethylhexyl) maleate; fumaric acid derivatives such as di-n-butyl fumarate and di-(2-ethylhexyl) fumarate; citric acid derivatives such as triethyl citrate, tri-n-butyl citrate, acetyl triethyl citrate, and acetyl tri-(2-ethylhexyl) citrate; itaconic acid derivatives such as monomethyl itaconate, monobutyl itaconate, dimethyl itaconate, diethyl itaconate, dibutyl itaconate, and di-(2-ethylhexyl) itaconate; oleic acid derivatives such as butyl oleate, glyceryl monooleate, and diethylene glycol monooleate; ricinoleic acid derivatives such as methyl acetyl ricinoleate, butyl acetyl ricinoleate, glyceryl monoricinoleate, and diethylene glycol monoricinoleate; stearic acid derivatives such as n-butyl stearate and diethylene glycol distearate; other fatty acid derivatives such as diethylene glycol monolaurate, diethylene glycol dipelargonate, and pentaerythritol fatty acid esters; phosphoric acid derivatives such as triethyl phosphate, tributyl phosphate, tri-(2-ethylhexyl) phosphate, tributoxyethyl phosphate, triphenyl phosphate, cresyl diphenyl phosphate, tricresyl phosphate, trixylenyl phosphate, and tris(chloroethyl) phosphate; glycol derivatives such as diethylene glycol dibenzoate, dipropylene glycol dibenzoate, triethylene glycol dibenzoate, triethylene glycol di-(2-ethylbutyrate), triethylene glycol di-(2-ethylhexoate), and dibutyl methylene bisthioglycolate; glycerin derivatives such as glycerol monoacetate, glycerol triacetate, and glycerol tributyrate; epoxy derivatives such as diisodecyl epoxyhexahydrophthalate, epoxy triglyceride, epoxidized octyl oleate, and epoxidized decyl oleate; and polyester plasticizers such as adipic acid polyesters, sebacic acid polyesters, and phthalic acid polyesters.

Examples of so-called secondary plasticizers include chlorinated paraffins, fatty acid esters of glycols such as triethylene glycol dicaprylate, butyl epoxy stearate, phenyl oleate, and methyl dihydroabietate.

The vinyl chloride resin composition for powder forming may contain one or more different types of plasticizers. When a secondary plasticizer is used, it is preferred to use the same or larger amount (by mass) of a primary plasticizer in combination.

The content of the plasticizer per 100 parts by mass of the vinyl chloride resin (a) is preferably 30 parts by mass or more, more preferably 60 parts by mass or more, even more preferably 90 parts by mass or more, and preferably 200 parts by mass or less, more preferably 170 parts by mass or less, even more preferably 160 parts by mass or less. When the content of the plasticizer is within the above range, the plasticizer is well absorbed by the vinyl chloride resin (a), so that the polyvinyl chloride resin composition for powder forming shows good powder formability.

[[Perchloric Acid-Treated Hydrotalcite]]

The vinyl chloride resin composition for powder forming may contain perchloric acid-treated hydrotalcite. The perchloric acid-treated hydrotalcite can be easily produced for example by adding hydrotalcite to a dilute aqueous solution of perchloric acid, stirring the mixture, and optionally filtering, dehydrating or drying the mixture to replace at least some carbonate anions ($CO_3^{2-}$) in the hydrotalcite by perchlorate anions ($ClO_4^-$) (two moles of perchlorate anions are replaced per one mole of carbonate anions). The molar ratio of hydrotalcite to perchloric acid is not limited but, typically, 0.1 to 2 moles of perchloric acid are used per one mole of hydrotalcite.

It is preferred that 50 mol % or more, more preferably 70 mol % or more, even more preferably 85 mol % or more, of carbonate anions in the untreated (unsubstituted) hydrotalcite is replaced by perchlorate anions. It is preferred that 95 mol % or less of carbonate anions in the untreated (unsubstituted) hydrotalcite is replaced by perchlorate anions.

Hydrotalcite is a nonstoichiometric compound represented by the general formula $[Mg_{1-x}Al_x(OH)_2]^{x+}[(CO_3)_{x/2} \cdot mH_2O]^{x-}$, which is an inorganic substance having a layered crystalline structure composed of a positively charged base layer $[Mg_{1-x}Al_x(OH)_2]^{x+}$ and a negatively charged intermediate layer $[(CO_3)_{x/2} \cdot mH_2O]^{x-}$. In the general formula above, x is a number in a range from greater than 0 to 0.33. Naturally occurring hydrotalcite has the formula $Mg_6Al_2(OH)_{16}CO_3 \cdot 4H_2O$. One commercially available synthetic hydrotalcite has the formula $Mg_{4.5}Al_2(OH)_{13}CO_3 \cdot 3.5H_2O$. A method for synthesizing synthetic hydrotalcite is described for example in JP-B No. 61-174270.

A preferred content of the perchloric acid-treated hydrotalcite per 100 parts by mass of the vinyl chloride resin (a) is 0.5 parts by mass to 7 parts by mass, more preferably 1 part by mass to and 6 parts by mass, even more preferably 1.5 parts by mass to 5.5 parts by mass.

[[Zeolite]]

The vinyl chloride resin composition for powder forming may contain zeolite as a stabilizer. Zeolite is a compound represented by the general formula $M_{x/n} \cdot [(AlO_2)_x \cdot (SiO_2)_y] \cdot zH_2O$ (where M is a metal ion having a valence n, x+y is the number of tetrahedrons per unit lattice, z is the number of moles of water). Examples of M in the general formula include monovalent or divalent metals such as Na, Li, Ca, Mg and Zn, and mixed forms thereof.

The zeolite content is not limited to a specific range. A preferred zeolite content is 0.1 parts by mass to 5 parts by mass per 100 parts by mass of the vinyl chloride resin (a).

[[Fatty Acid Metal Salts]]

The vinyl chloride resin composition for powder forming may contain a fatty acid metal salt. Preferred fatty acid metal salts are monovalent fatty acid metal salts, more preferred fatty acid metal salts are monovalent fatty acid metal salts having 12 to 24 carbon atoms, and even more preferred fatty acid metal salts are monovalent fatty acid metal salts having 15 to 21 carbon atoms. Specific examples of fatty acid metal salts include lithium stearate, magnesium stearate, aluminum stearate, calcium stearate, strontium stearate, barium stearate, zinc stearate, calcium laurate, barium laurate, zinc laurate, barium 2-ethylhexanoate, zinc 2-ethylhexanoate, barium ricinoleate, and zinc ricinoleate. Metals that constitute the fatty acid metal salts are preferably metals that may form multivalent cations, more preferably metals that may form divalent cations, even more preferably metals that may form divalent cations and belong to period 3 to period 6 of the periodic table, and particularly preferably metals that may form divalent cations and belong to period 4 of the periodic table. The most preferred fatty acid metal salt is zinc stearate.

The content of the fatty acid metal salt per 100 parts by mass of the vinyl chloride resin (a) is preferably 0.05 parts by mass to 5 parts by mass, more preferably 0.1 parts by mass to 1 part by mass, even more preferably 0.1 parts by mass to 0.5 parts by mass. When the content of the fatty acid metal salt is within the above range, the color difference value of a vinyl chloride resin layer formed by powder forming of the vinyl chloride resin composition for powder forming can be reduced.

[[Other Dusting Agents]]

The vinyl chloride resin composition for powder forming may contain a dusting agent other than the vinyl chloride resin fine particles (a2). Specific examples of other dusting agents include inorganic fine particles such as calcium carbonate fine particles, talc fine particles, and aluminum oxide fine particles; and organic fine particles such as polyacrylonitrile resin fine particles, poly(meth)acrylate resin fine particles, polystyrene resin fine particles, polyethylene resin fine particles, polypropylene resin fine particles, polyester resin fine particles, and polyamide resin fine particles. Among them, inorganic fine particles having an average particle diameter of 10 nm to 100 nm are preferred.

The content of other dusting agents is not limited to a specific range; the content is preferably 20 parts by mass or less, more preferably 10 parts by mass or less, per 100 parts by mass of the vinyl chloride resin (a).

[[Other Additives]]

The polyvinyl chloride resin composition for powder forming may contain other additives such as coloring agents, impact resistance improvers, perchloric acid compounds other than perchloric acid-treated hydrotalcite (e.g., sodium perchlorate, potassium perchlorate), antioxidants, antifungal agents, flame retardants, antistatic agents, fillers, light stabilizers, foaming agents, and/or β-diketones.

Specific examples of coloring agents include quinacridone pigments, perylene pigments, polyazo condensation pigments, isoindolinone pigments, copper phthalocyanine pigments, titanium white, and carbon black. One or more different types of pigments are used.

Quinacridone pigments are obtained by treating p-phenylenedianthranilic acids with concentrated sulfuric acid and show a hue ranging from yellowish red to reddish purple. Specific examples of the quinacridone pigments include quinacridone red, quinacridone magenta, and quinacridone violet.

Perylene pigments are obtained by a condensation reaction of perylene-3,4,9,10-tetracarboxylic anhydrides and aromatic primary amines, and show a hue ranging from red to red purple and brown. Specific examples of the perylene pigments include perylene red, perylene orange, perylene maroon, perylene vermilion, and perylene bordeaux.

Polyazo condensation pigments are obtained by condensation of azo dyes in solvent to have a high molecular weight, and show a hue of yellow and red pigments. Specific examples of the polyazo condensation pigments include polyazo red, polyazo yellow, chromophthal orange, chromophthal red, and chromophthal scarlet.

Isoindolinone pigments are obtained by a condensation reaction of 4,5,6,7-tetrachloroisoindolinone and aromatic primary diamines, and show a hue ranging from greenish yellow to red and brown. Specific examples of the isoindolinone pigment include isoindolinone yellow.

Copper phthalocyanine pigments are pigments in which copper is coordinated to phthalocyanines, and show a hue ranging from yellowish green to vivid blue. Specific examples of the copper phthalocyanine pigments include phthalocyanine green and phthalocyanine blue.

Titanium white is a white pigment made of titanium dioxide, which has high opacity and occur in anatase or rutile form.

Carbon black is a black pigment mainly composed of carbon and contains oxygen, hydrogen, and nitrogen. Specific examples of carbon black include thermal black, acetylene black, channel black, furnace black, lamp black, and bone black.

Specific examples of impact resistance improvers include acrylonitrile-butadiene-styrene copolymers, methyl methacrylate-butadiene-styrene copolymers, chlorinated polyethylenes, ethylene-vinyl acetate copolymers, and chlorosulfonated polyethylenes. In the vinyl chloride resin composition for powder forming, one or more different types of impact resistance improvers can be used. The impact resistance improver is dispersed in the vinyl chloride resin composition as a heterogeneous phase of fine elastic particles. When the vinyl chloride resin composition for powder forming contains the vinyl chloride resin particles (a1), chains graft-polymerized to the elastic particles and the groups become compatible with the vinyl chloride resin particles (a1), so that the impact resistance of the vinyl chloride resin layer improves.

Specific examples of antioxidants include phenol antioxidants, sulfur antioxidants, and phosphorus antioxidants.

Specific examples of antifungal agents include aliphatic ester antifungal agents, hydrocarbon antifungal agents, organic nitrogen antifungal agents, and organic nitrogen sulfur antifungal agents.

Specific examples of flame retardants include halogen flame retardants such as chlorinated paraffins; phosphorus flame retardants such as phosphate esters; and inorganic hydroxides such as magnesium hydroxide and aluminum hydroxide.

Specific examples of antistatic agents include anionic antistatic agents such as fatty acid salts, higher alcohol sulfuric acid esters, and sulfonic acid salts; cationic antistatic agents such as aliphatic amine salts and quaternary ammonium salts; and nonionic antistatic agents such as polyoxyethylene alkyl ethers and polyoxyethylene alkylphenol ethers.

Specific examples of fillers include silica, talc, mica, calcium carbonate, and clay.

Specific examples of light stabilizers include ultraviolet absorbers such as benzotriazole ultraviolet absorbers, benzophenone ultraviolet absorbers, and nickel chelate ultraviolet absorbers; and hindered amine light stabilizers.

Specific examples of foaming agents include organic foaming agents such as azo compounds such as azodicarbonamide and azobisisobutyronitrile, nitroso compounds such as N, N'-dinitrosopentamethylenetetramine, and sulfonyl hydrazide compounds such as p-toluenesulfonylhydrazide, and p,p-oxybis (benzene sulfonyl hydrazide); Freon gas, carbon dioxide gas, water, and volatile hydrocarbon compounds such as pentane; and gas-based foaming agents such as microcapsules encapsulating the foregoing.

β-diketones may be used to more effectively reduce changes in the initial color tone of the vinyl chloride resin layer obtained by powder forming of the above-mentioned vinyl chloride resin composition for powder forming. Specific examples of β-diketones include dibenzoylmethane, stearoylbenzoylmethane, and palmitoylbenzoylmethane. These β-diketones may be used alone or in combination.

The β-diketone content is not limited to a specific range. A preferred β-diketone content is 0.1 parts by mass to 5 parts by mass per 100 parts by mass of the vinyl chloride resin (a).

Any suitable method can be used to mix the vinyl chloride resin (a) and additives added as needed. A preferred mixing method involves mixing components other than the dusting agent (including the vinyl chloride resin fine particles (a2)) by dry blending, followed by mixing of the dusting agent. Dry blending is preferably carried out using HENSCHEL MIXER. The temperature upon dry blending is preferably 50° C. to 200° C., more preferably 70° C. to 200° C.

The vinyl chloride resin layer of the disclosed laminate for automotive interior material is obtained by powder forming, preferably powder slush molding, of the above-mentioned vinyl chloride resin composition for powder forming. The mold temperature at the time of powder slush molding is preferably 200° C. to 300° C., more preferably 220° C. to 280° C. Upon manufacture of the vinyl chloride resin layer, for example, the vinyl chloride resin composition for powder forming is sprinkled over a metal mold having the above mold temperature range and is left to stand for 5 seconds to 30 seconds. An excess of the vinyl chloride the resin composition is then shaken off the mold and the vinyl chloride the resin composition on the mold is further left to stand for 30 seconds to 3 minutes. Thereafter, the mold is cooled to 10° C. to 60° C., and the resulting vinyl chloride resin layer is released from the mold.

When the disclosed laminate for automotive interior material is used to manufacture an automotive interior material garnished by sewing, the resulting vinyl chloride resin layer may be subjected to sewing using sewing methods known in the art, such as sewing of thread using a needle. Note that when the disclosed laminate for automotive interior material includes an additional layer provided between the vinyl chloride resin layer and tape, sewing may be performed at any timing, e.g., after laminating the vinyl chloride resin layer and such an additional layer. The vinyl chloride resin layer may be suitably used as the skin of automotive interior materials such as instrument panels or door trims.

The thickness of the vinyl chloride resin layer is not limited to a specific range; the thickness is preferably 100 μm or more, more preferably 500 μm or more, particularly preferably 800 μm or more, and preferably 3 mm or less, more preferably 2 mm or less, particularly preferably 1.5 mm or less.

<Tape>

The tape disposed on one side in the thickness direction of the vinyl chloride resin layer comprises a substrate having a porous structure and an adhesive layer positioned closer to the vinyl chloride resin layer than the substrate. The tape of the disclosed laminate for automotive interior material may comprise layer(s) other than the substrate and the adhesive layer as long as the target effect is not greatly compromised. Specifically, without limitation, the tape of the disclosed laminate for automotive interior material may have, for example, an additional adhesive layer on the opposite side to the adhesive layer. However, from the viewpoint of reliably preventing a mark from appearing on the portion where the tape is laminated at the time when the laminate for automotive interior material is heated, it is preferred that the tape consists only of the substrate and the adhesive layer.

In the disclosed laminate for automotive interior material, the tape can be provided at any position on one side in the thickness direction of the vinyl chloride resin layer. Specifically, without limitation, the tape can be provided on a part of one side in the thickness direction of the vinyl chloride resin layer. Specifically, for example, when the vinyl chloride resin layer has been subjected to sewing, the tape can be provided at a position covering the sewn portion.

[Substrate]

Specific examples of the substrate having a porous structure include nonwoven fabrics and foams. A preferred substrate is a nonwoven fabric. Specific examples of fibers constituting the nonwoven fabric include organic fibers such as polyamide fibers, polyaramide fibers, polyester fibers, cellulose, cotton, hemp, wool, and silk; and inorganic fibers such as glass fibers, carbon fibers, alumina fibers, tungsten fibers, molybdenum fibers, titanium fibers, steel fibers, boron fibers, silicon carbide fibers, and silica fibers. One or more different types of fibers may be used as the fibers constituting the nonwoven fabric. Among the above, organic fibers are preferred as the fibers constituting the nonwoven fabric, with polyester fibers being more preferred. That is, the substrate constituting the tape of the disclosed laminate for automotive interior material is preferably composed of organic fibers, more preferably polyester fibers. The fiber diameter is preferably 1 μm or more, more preferably 10 μm or more, and preferably 25 μm or less, more preferably 20 μm or less. A nonwoven fabric is obtained by forming the above fibers into a fleece by the dry process, wet process, spunbonding process, melt-blown process or other processes followed by bonding of the fleece by thermal bonding, chemical bonding, needle punching, spunlacing, stitch bonding, steam jetting or other methods. Although the weight per unit area of the nonwoven fabric is not particularly limited, it is preferably 20 g/m$^2$ to 100 g/m$^2$, more preferably 20 g/m$^2$ to 80 g/m$^2$, from the viewpoint of air permeability and price.

The thickness of the substrate is preferably 5 μm or more, more preferably 10 μm or more, and preferably 100 μm or less, more preferably 50 μm or less.

[Adhesive Layer]

Specific examples of polymers for an adhesive that forms the adhesive layer include conjugated diene polymers such as polybutadiene, synthetic polyisoprene, and natural rubbers; aromatic vinyl-conjugated diene copolymers such as styrene-butadiene copolymers and styrene-isoprene copolymers; hydrogenated aromatic vinyl-conjugated diene copolymers such as hydrogenated styrene-butadiene copolymers and hydrogenated styrene-isoprene copolymers; cyano group-containing vinyl-conjugated diene copolymers such as acrylonitrile-butadiene copolymers; hydrogenated cyano group-containing vinyl-conjugated diene copolymers such as hydrogenated acrylonitrile-butadiene copolymers; silicone polymers such as silicone rubbers and silicone resins; acrylic polymers such as acrylic rubbers and acrylic resins; urethane polymers; polyolefins such as polyethylenes and polypropylenes; polyesters; polyamides; epoxy polymers; vinyl alkyl ether polymers; and fluoropolymers such as fluororubbers and fluororesins. One or more different types of polymers for adhesive are used to form the adhesive layer. Among the above polymers, from the viewpoint of adhesion, aromatic vinyl-conjugated diene copolymers, hydrogenated aromatic vinyl-conjugated diene copolymers, acrylic polymers, and silicone polymers are preferred, with aromatic vinyl-conjugated diene copolymers and acrylic polymers being more preferred. That is, the adhesive layer constituting the tape of the disclosed laminate for automotive interior material preferably contains an aromatic vinyl-conjugated diene copolymer, a hydrogenated aromatic vinyl-conjugated diene copolymer, an acrylic polymer, or a silicone polymer, more preferably an aromatic vinyl-conjugated diene copolymer or an acrylic polymer.

Further, it is preferred that the adhesive layer has a porous structure. It is preferred that the tape has a porous structure in its entirety. The presence of porous structure allows components such as plasticizers to easily pass through the adhesive layer or tape.

The thickness of the adhesive layer is preferably 1 μm or more, more preferably 3 μm or more, and preferably 10 μm or less, more preferably 8 μm or less.

The tape is attached to one side in the thickness direction of the vinyl chloride resin layer using the adhesive layer. Specifically, for example, when the disclosed laminate for automotive interior material consists only of the vinyl chloride resin layer and tape, the adhesive layer is attached to the vinyl chloride resin layer, so that the vinyl chloride resin layer and tape are laminated.

The disclosed laminate for automotive interior material is laminated with a foam such as a foamed polyurethane article. This lamination can be accomplished for example by separately preparing the disclosed laminate and a foam (e.g., foamed polyurethane article) and bonding them together by thermal fusion or bonding, or with any suitable adhesive known in the art; or by reacting raw materials of the foam (e.g., isocyanates and polyols), which are raw materials of the foamed polyurethane article, for polymerization on the disclosed laminate while foaming polyurethane by any suitable method known in the art. The latter method is more suitable because of its simple process and the capability of ensuring adhesion between the disclosed laminate and the foamed polyurethane article for various shapes of the resulting laminate.

EXAMPLES

Hereinafter, the present disclosure will be described in detail by way of Examples, which however shall not be construed as limiting the scope of the present disclosure.

In the following Examples and Comparative Examples, the average degrees of polymerization of vinyl chloride resin particles and vinyl chloride resin fine particles were calculated based on the viscosities of cyclohexanone solutions of the respective resin particles measured in compliance with JIS K 6720-2.

The average particle diameters (volume-average particle diameters) of the vinyl chloride resin particles and vinyl chloride resin fine particles were calculated based on the particle sizes and volume-based particle size distributions which were measured by dispersing the vinyl chloride resin particles and the vinyl chloride resin fine particles in respective water baths and measuring and analyzing light diffraction/scattering intensity distributions using the device described below:
 Laser diffraction particle size analyzer (SALD-2300, Shimadzu Corporation)
 Measurement method: laser diffraction and scattering
 Measurement range: 0.017 μm to 2,500 μm
 Light source: semiconductor laser (wavelength 680 nm, output 3 mW)

Examples 1 and 2, Comparative Examples 1 and 2

The components listed in Table 1 except for the plasticizer (trimellitic acid ester and epoxidized soybean oil) and vinyl chloride resin fine particles as a dusting agent were placed in HENSCHEL MIXER and mixed. The plasticizer was added once the temperature of the mixture rose to 80° C., and the temperature was further raised for dry-up (state in which the plasticizer is absorbed by the vinyl chloride resin particles and the mixture becomes powdery). Thereafter, the vinyl chloride resin fine particles as a dusting agent were added once the dry-up mixture was cooled to 100° C. or lower to prepare a vinyl chloride resin composition for powder forming.

The obtained vinyl chloride resin composition for powder forming was sprinkled over a textured mold heated to 250° C. and left to stand to melt for a duration adjusted such that a molded sheet of vinyl chloride resin has a thickness of 1 mm (specifically, for 8 to 20 seconds). An excess of the vinyl chloride resin composition was then shaken off the mold. The mold was placed in an oven set at 200° C. After 60 seconds, the mold was cooled with cooling water and a 150 mm×200 mm×1 mm molded sheet of vinyl chloride resin (vinyl chloride resin layer) was released from the mold once the mold temperature was lowered to 40° C. Subsequently, a tape having the structure shown in Table 2 was laminated on a part of a surface (opposite to the textured surface) of the obtained vinyl chloride resin molded sheet to provide a laminate for automotive instrument panel.

Next, a 250 mm×340 mm×2 mm aluminum sheet was placed at the bottom of a 200 mm×300 mm×10 mm mold, and two molded sheets of vinyl chloride resin laminated with a tape (laminate for automotive instrument panel) were attached to a 348 mm×255 mm×10 mm lid of the mold with the textured surface of the sheets facing the lid. Further, a polyol mixture consisting of 50 parts by mass of PO (propylene oxide)·EO (ethylene oxide) block adduct of propylene glycol (hydroxyl value 28, content of terminal EO units=10%, internal EO unit content 4%), 50 parts by mass of PO·EO block adduct of glycerin (hydroxyl value 21, content of terminal EO units=14%), 2.5 parts by mass of water, 0.2 parts by mass of ethylene glycol solution of triethylene diamine ("TEDA-L33" Tosoh Corporation), 1.2 parts by mass of triethanolamine, 0.5 parts by mass of triethylamine and 0.5 parts by mass of a foam stabilizer ("F-122" Shin-Etsu Chemical Co., Ltd.) and a polymethylene polyphenylene polyisocyanate (polymeric MDI) were mixed at a ratio such that the index becomes 98 to prepare a mixture. Next, the resulting mixture was poured into the mold, and the mold was sealed with the lid having the molded sheets of vinyl chloride resin attached. 5 minutes later, a sample having a skin formed of a 1 mm-thick vinyl chloride resin molded sheet lined with a 9 mm-thick foamed polyurethane article having a density of 0.18 g/cm$^3$ (laminate of vinyl chloride resin molded sheet with a tape; foamed polyurethane article; and aluminum sheet) was taken out from the mold and subjected to the heat resistance test described below. The results are shown in Table 2.

<Heat Resistance Test>

The sample was placed in an oven set at 130° C. The sample was taken out from the oven every 100 hours and cooled to room temperature. In each case five examiners visually checked the appearance of the sample, which was evaluated based on the following three criteria:

Excellent: All of the five examiners judged that no tape mark appeared

Good: Three or four of the five examiners judged that no tape mark appeared

Poor: Two or fewer of the five examiners judged that no tape mark appeared.

TABLE 1

| Composition (parts by mass) | | |
|---|---|---|
| Vinyl chloride resin particles[1] | 100.0 |
| Trimellitic acid ester[2] | 135.0 |
| Epoxidized soybean oil[3] | 5.0 |
| 90% perchloric acid-treated hydrotalcite[4] | 4.5 |
| Zeolite[5] | 2.4 |
| Stearoylbenzoylmethane[6] | 0.5 |
| Zinc stearate[7] | 0.2 |
| Dusting agent[8] | 20.0 |
| Pigment[9] | 4.0 |

[1] ZEST 2500Z (vinyl chloride resin particles (vinyl chloride resin particles (a1)), average degree of polymerization = 2,500, average particle diameter = 130 μm) manufactured by Shin Dai-Ichi Vinyl Corporation
[2] TRIMEX N-08 manufactured by Kao Corporation
[3] ADEKA CIZER O-130S manufactured by ADEKA CORPORATION
[4] Alcamizer 5 manufactured by Kyowa Chemical Industry Co., Ltd.
[5] MIZUKALIZER DS manufactured by Mizusawa Chemical Co., Ltd.
[6] Karenz DK-1 manufactured by Showa Denko K.K.
[7] SAKAI SZ 2000 manufactured by Sakai Chemical Industry Co., Ltd.
[8] ZEST PQLTX (vinyl chloride resin fine particles obtained by emulsion polymerization (vinyl chloride resin fine particles (a2)), average degree of polymerization degree = 800, average particle diameter = 2 μm) manufactured by Shin Dai-Ichi Vinyl Corporation
[9] DA PX-1720 black (A) manufactured by Dainichiseika Color & Chemicals Mfg. Co.

To confirm the permeability of the tapes used in Examples and Comparative Examples, the above four tapes were affixed on 200 mm×200×8 mm cotton nonwoven fabrics, and tri-(2-ethylhexyl) trimellitate (plasticizer) was dropped onto each tape. As a result, the plasticizer passed through the tapes used in Examples 1 and 2 immediately after dropping, but stopped on the tapes used in Comparative Examples 1 and 2 even after 6 hours.

In the laminates of Examples 1 and 2 consisting of vinyl chloride resin molded sheet laminated with a tape; foamed polyurethane article; and aluminum sheet, the substrate of the tape has a porous structure made of nonwoven fabric. Thus, even when heated, no mark appeared at the portion where the tape is laminated. On the other hand, when the laminates of Comparative Examples 1 and 2 consisting of vinyl chloride resin molded sheet laminated with a tape whose substrate does not have a porous structure; foamed polyurethane article; and aluminum sheet were heated, a mark appeared at the portion where the tape is laminated.

INDUSTRIAL APPLICABILITY

The disclosed laminate for automotive interior material can maintain a good appearance even when exposed to high temperatures for long periods of time.

REFERENCE SIGNS LIST

1 Skin
2 Thread
3 Tape
4 Foamed polyurethane layer

The invention claimed is:

1. A laminate for automotive interior material, comprising:
a vinyl chloride resin layer containing an additive wherein the additive comprises a plasticizer; and
wherein the vinyl chloride resin layer has holes formed by sewing,
a tape disposed on one side in a thickness direction of the vinyl chloride resin layer,
wherein the tape comprises a substrate having a porous structure, and an adhesive layer, and the tape is provided at a position covering the holes,
wherein the adhesive layer is positioned between the vinyl chloride resin layer and the substrate, and

TABLE 2

| | Tape structure | 100 hr | 200 hr | 300 hr | 400 hr | 500 hr |
|---|---|---|---|---|---|---|
| Example 1 | Polyester nonwoven fabric (weight per unit area: 25 g/m$^2$)/styrene-isoprene copolymer porous adhesive layer[10] | Excellent | Excellent | Excellent | Excellent | Excellent |
| Example 2 | Polyester nonwoven fabric (weight per unit area: 25 g/m$^2$)/acrylic polymer porous adhesive layer[11] | Excellent | Excellent | Excellent | Excellent | Excellent |
| Comparative Example 1 | Polyimide/silicone adhesive layer[12] | Poor | Poor | Poor | Poor | Poor |
| Comparative Example 2 | Acetate/acrylic resin adhesive layer[13] | Poor | Poor | Poor | Poor | Poor |

[10] NITOTHROUGH APO300 (substrate: polyester nonwoven fabric, adhesive layer: styrene-isoprene copolymer porous layer) manufactured by Nitto Lifetech Corporation
[11] NITOTHROUGH AP6300 (substrate: polyester nonwoven fabric, adhesive layer: acrylic polymer porous layer) manufactured by Nitto Lifetech Corporation
[12] Polyimide adhesive tape NO. 360 UL manufactured by Nitto Denko Corporation
[13] Scotch mending tape manufactured by 3M Japan Ltd.

wherein the substrate is made of non-woven fabric having a weight per unit area of 20 g/m² to 100 g/m² to allow the additive contained in the vinyl chloride resin layer to pass through the tape, thereby providing higher surface quality and improved appearance of the vinyl chloride resin layer.

2. The laminate for automotive interior material of claim 1, wherein the adhesive layer has a porous structure.

3. The laminate for automotive interior material of claim 1, wherein the laminate is for automotive instrument panel.

4. The laminate for automotive interior material of claim 1, wherein a fiber diameter of fibers constituting the non-woven fabric is 1 μm or more and 25 μm or less.

5. The laminate for automotive interior material of claim 1, wherein a thickness of the substrate is 5 μm or more and 100 μm or less.

6. The laminate for automotive interior material of claim 1, wherein a thickness of adhesive layer is 1 μm or more and 10 μm or less.

7. The laminate for automotive interior material of claim 1, wherein the additive further comprises a material which is selected from a group consisting of perchloric acid-treated hydrotalcite, zeolite, a fatty acid metal salt, a dusting agent, and a mixture thereof.

* * * * *